(12) United States Patent
Niwa

(10) Patent No.: US 6,983,154 B2
(45) Date of Patent: Jan. 3, 2006

(54) DATA DISTRIBUTION SYSTEM

(75) Inventor: Yushi Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 559 days.

(21) Appl. No.: 09/833,043

(22) Filed: Apr. 12, 2001

(65) Prior Publication Data
US 2002/0039903 A1 Apr. 4, 2002

(30) Foreign Application Priority Data
Apr. 13, 2000 (JP) ......................... 2000-112176

(51) Int. Cl.
H04Q 7/20 (2006.01)
H04B 7/26 (2006.01)

(52) U.S. Cl. ................. 455/456.1; 455/456.5; 340/994; 701/201

(58) Field of Classification Search .............. 455/456.1, 455/456.3, 456.5, 414.1, 412.1, 412.2, 556.1, 455/456.2, 457; 340/988, 992, 994; 701/201–202, 701/210
See application file for complete search history.

(56) References Cited

U.S. PATENT DOCUMENTS

| | | | | |
|---|---|---|---|---|
| 5,987,377 A | * | 11/1999 | Westerlage et al. ......... | 701/204 |
| 6,236,338 B1 | * | 5/2001 | Hamada .................. | 340/995.1 |
| 6,353,794 B1 | * | 3/2002 | Davis et al. ............... | 701/201 |
| 6,363,323 B1 | * | 3/2002 | Jones ..................... | 701/213 |
| 6,389,288 B1 | * | 5/2002 | Kuwahara et al. ......... | 455/456.6 |
| 6,459,964 B1 | * | 10/2002 | Vu et al. ................. | 701/19 |
| 6,609,005 B1 | * | 8/2003 | Chern .................... | 455/457 |
| 6,618,668 B1 | * | 9/2003 | Laird ..................... | 701/204 |
| 6,625,457 B1 | * | 9/2003 | Raith .................... | 455/456.1 |

FOREIGN PATENT DOCUMENTS

| | | |
|---|---|---|
| JP | 11-136365 | 5/1999 |
| WO | WO 97/41654 | 11/1997 |
| WO | WO 99/63709 | 12/1999 |
| WO | WO 00/04734 | 1/2000 |

* cited by examiner

Primary Examiner—William Trost
Assistant Examiner—Brandon J. Miller
(74) Attorney, Agent, or Firm—Foley & Lardner LLP

(57) ABSTRACT

When going to a destination, a user of a mobile telephone set stores data distribution plan information in a distribution center via a base station. In the distribution center, an error data for arrival time at the destination is calculated, and is stored in a data distribution plan information storage section. The data distribution plan information storage section subtracts an error time period, after which arrival will be earlier, and generates data distribution plan information. A data transmitting section sets a difference between the current time and distribution scheduled time in a timer circuit, and when time has come, transmits a distribution data stored in a distribution data storage section to the mobile type telephone set.

11 Claims, 17 Drawing Sheets

FIG.4

| # | DATE | TIME | PLACE | MOBILE MEANS | DISTRIBUTION DATA |
|---|---|---|---|---|---|
| 1 | 2000.04.07 | 06:00 | TOYAMA STATION (T00231) | MOVEMENT BY ELECTRIC TRAIN (TRAIN) | STA_TOYAMA.bmp |
| 2 | 2000.04.07 | 07:20 | NANAO ONSEN (T01551) | MOVEMENT BY BUS (BUS) | MPA_NANAO.bmp |
| 3 | 2000.04.07 | 07:20 | NANAO ONSEN (T01551) | MOVEMENT BY BUS (BUS) | MENU_HOTEL.1st |
| | ......... | ...... | ......... | ......... | |

FIG.5

| MOBILE MEANS | REFERENCE ERROR |
|---|---|
| MOVEMENT BY ELECTRIC TRAIN (TRAIN) | 00:05 |
| MOVEMENT BY BUS (BUS) | 00:10 |
| MOVEMENT BY MY CAR (MYCAR) | 00:40 |
| MOVEMENT BY DOMESTIC PLANE (D-PLANE) | 00:20 |
| MOVEMENT BY INTERNATIONAL PLANE (I-PLANE) | 01:00 |
| DEPARTURE OF PARTY FROM HOTEL | 00:15 |
| DEPARTURE OF INDIVIDUAL FROM HOTEL | 00:30 |
| ................................ | ............... |

DATE DAY COEFFICIENT

| DATE | DAY | COEFFICIENT |
|---|---|---|
| - - - - - - - - - - - - - - - | - - - - - - - | - - - - - - - |
| 2000.04.04 | FRY | 1.1 |
| 2000.04.05 | SAT | 2.0 |
| 2000.04.06 | SUN | 2.0 |
| 2000.04.07 | MON | 1.0 |
| 2000.04.08 | TUE | 1.0 |
| - - - - - - - - - - - - - - - | - - - - - - - | - - - - - - - |

| | | ⌐ 251 |
|---|---|---|
| DATE | TIME | DISTRIBUTION DATA |
| 2000.04.07 | 05:55 | STA_TOYAMA.bmp |
| 2000.04.07 | 07:10 | MPA_NANAO.bmp |
| 2000.04.07 | 07:10 | MENU_HOTEL.1st |
| ---------------- | ---------- | ------------------------------ |

FIG. 13

| PLACE | LATITUDE AND LONGITUDE | ERROR |
|---|---|---|
| TOYAMA STATION (T00231) | E137.12.58.5 N36.41.54.0 | 0.01 |
| NANAO ONSEN (T01551) | E136.57.1.7 N37.2.19.3 | 0.05 |
| NANAO ONSEN (T01551) | E136.57.1.7 N37.2.19.3 | 0.05 |
| ------------- | --------------------- | -------- |

| DATE | REGION | DISTRIBUTION DATA |
|---|---|---|
| 2000.04.07 | $E_1$ | STA_TOYAMA.bmp |
| 2000.04.07 | $E_2$ | MPA_NANAO.bmp |
| 2000.04.07 | $E_3$ | MENU_HOTEL.1st |
| ............... | ......... | .............................. |

251A

DATA DISTRIBUTION SYSTEM

BACKGROUND OF THE INVENTION

The present invention relates to a data distribution system for distributing data to a radio terminal, and especially, to a data distribution system capable of suitably providing necessary information to a radio terminal.

A radio terminal such as a mobile type telephone set and so forth not only can utilize a function for making a call and transmitting an electronic mail, but also can store various kinds of information in an internal memory and utilize this stored information. For example, utilization is one example, in which map information is stored in a memory in advance, and this is used at arrival to a destination. Although such several kinds of information can be stored in a memory in a radio terminal, especially in case of a mobile type device, capacity of a memory is restricted and information which can be stored is not so much. Accordingly, a method is widely adopted, in which information is stored in a memory each time by utilizing a communication function of a radio terminal. Also, from a viewpoint where updated information is utilized, a method is effective, in which such necessary information is down-loaded at a necessary time point.

Also, push type distribution service is given attention. In such push type distribution service, a user does not obtain information by especially having access to a content server of internet, and registered information is automatically sent to a radio terminal of a user. On the other hand, in JP-A-136365/1999, a high capacity memory is built in a mobile terminal, and contents which a user desires are distributed by a communication provider system and are automatically stored in the memory. At this time, in case that there is enough time until time when distribution is desired, a time band where a load is less is selected by taking traffic of communication into account, and distribution is executed, and thereby, economical distribution can be realized. As a result, a user stores contents in a memory until desired time, and can reproduce them whenever he or she wants. Also, in case that information stored in a memory increases and a storage region for new information becomes less, it can be suitable deleted.

However, in a technology described in JP-A-136365/1999, it is assumed that the high capacity memory is built in the mobile terminal. Accordingly, unless such a high capacity memory is provided, time margin for information storage becomes less, and cost-up of hardware is certainly introduced. Supposing that capacity of a memory to be built in is small, if contents are distributed in a duplicate form in time, a space in the memory is lost, and after that, a situation occurs that other information cannot be obtained. As a result, there is a possibility that a situation occurs where distribution is conducted after scheduled time.

In case that such a situation occurs, even though map information is required by a reason why a user wants to see a map of a station area when the user arrives at a Tokyo station for example, inconvenience that this information cannot be received at arrival time to the Tokyo station occurs. Accordingly, a case in which information obtained with much trouble is not at all useful appears. Thereby, in case that a distribution fee for the information is charged, this is disadvantageous to the user.

SUMMARY OF THE INVENTION

The present invention is made to solve the above-mentioned problems.

Moreover, an objective of the present invention is to provide a data distribution system for conducting data distribution so that, when a user of a radio terminal moves to a destination, the user can receive a data to be utilized at the destination just before the destination as near as possible, and can utilize the data.

In the first invention, a data distribution system comprises: (A) a mobile information table for storing reference required time periods which are references of required time periods required when a radio terminal moves to a destination that is a place of a destination of movement from departure places which are origins of the movement, respectively, and that is a place where utilization of information distributed in advance is conducted by means of the radio terminal, in accordance with mobile means which is used for movement; (B) movement specifying means for specifying departure places and destinations stored in this mobile information table in accordance with a movement schedule together with starting date and hour of the movement and the mobile means; (C) error calculating means for calculating an error in time for date and hour which is a reference when the radio terminal arrives at the respective destinations, based on information specified by this movement specifying means; (D) data distribution plan information generating means for obtaining date and hour when the radio terminal arrives at a destination from the respective departure places using the mobile means specified by the movement specifying means by correcting an error calculated by the error calculating means from the date and hour in case of using the reference required time periods, as date and hour when it arrives at the destination most quickly within a range of the error; (E) arrival time point detecting means for comparing arrival date and hour corrected for each destination, which is generated by this data distribution plan information generating means, with current date and hour, and detecting a time point when the radio terminal arrives at the respective destinations; (F) distribution data storing means for storing a data to be distributed to said radio terminal for every destination; and (G) distribution data distributing means for distributing a distribution data corresponding to a destination from the distribution data storing means every time the arrival time point detecting means detects arrival of the radio terminal at the respective destinations.

In other words, in the first invention, a table of the mobile information table is prepared, and in this table, the reference required time periods required when the radio terminal moves to the destination from the departure places are stored in accordance with the mobile means which is used for movement. Here, the destination is a place where utilization of information distributed in advance is conducted by means of the radio terminal. The movement specifying means specifies departure places and destinations stored in the mobile information table, and specifies starting date and hour of the movement and the mobile means. Thereby, standard date and hour or timing when the radio terminal arrives at the destination can be estimated. However, if a distribution data is distributed at the estimated time, in case that the mobile means such as a bus and so forth arrives there earlier, necessary distribution data has not been received yet at a time point when the radio terminal arrives at the destination, and this cannot be utilized. Also, in case that the arrival is delayed, the necessary distribution data is received fairly before, and if it competes with reception of other data, it becomes to be a cause of exerting pressure upon the memory of the radio terminal. Accordingly, in the invention recited in claim 1, the error calculating means is provided, and an error in time for date and hour which is a reference when the radio terminal arrives at the respective destinations, based on information specified by the movement specifying means. For example, it is calculated how extent of an error in time occurs for a case of a bus and for a case of an electric train, and how extent of error occurs in case of taking a day into account. The data distribution plan information generating means obtains date and hour when the radio terminal arrives at a destination from the respective departure places by correcting an error calculated by the error calculating means from the date and hour in case of using the reference required time periods, as date and hour when it arrives at the destination most quickly within a range of the error.

In this manner, in the first invention, since the reference required time periods are corrected by using the error in time, and the date and hour when the radio terminal arrives at the destination is calculated, it is possible to certainly distribute the distribution data before the arrival to the destination, and also, compared with the conventional data distribution system wherein distribution is conducted especially without taking time into account if the time is before arrival at a destination, efficient utilization of the memory in the radio terminal can be realized. Also, since the distribution data which is received when the destination is close is always used at the destination in future, there is no fear that a distribution data for the next destination is distributed at about the same time. Accordingly, it is possible to efficiently prevent situation from occurring, in which it takes much time to change electric trains due to a mistake of the received distribution data, and for example, by using a map of a wrong station.

In the second invention, a data distribution system comprises: (A) based on longitude and latitude representing a typical position in destinations that are places where utilization of information distributed in advance is conducted by means of a radio terminal, and areas of those destinations, a longitude and latitude table for contrasting errors between the typical position and other positions in the destinations and storing them; (B) destination specifying means for specifying destinations stored in this longitude and latitude table; (C) longitude and latitude measuring means for measuring longitude and latitude at respective time points during movement of the radio terminal; (D) arrival time point detecting means for detecting a time point when a position measured by the longitude and latitude measuring means arrives within a range of the errors centering around the typical position of a corresponding destination stored in the longitude and latitude table, when the radio terminal moves to a destination specified by the destination specifying means; (E) distribution data storing means for storing a data to be distributed to the radio terminal for every destination; and (F) distribution data distributing means for distributing a distribution data corresponding to a destination from the distribution data storing means every time the arrival time point detecting means detects arrival of the radio terminal at the respective destinations.

In other words, in the second invention, a table of the longitude and latitude table is prepared, and in this table, based on longitude and latitude representing the typical position in the destinations that are places where utilization of information distributed in advance is conducted by means of the radio terminal, and areas of those destinations, the errors between the typical position and other positions in the destinations are contrasted and stored. Longitude and latitude information of the destinations is stored in accordance with the respective destinations, and in addition, in order to cover a discrepancy of the longitude and latitude, which is caused by the areas of the destinations, the errors between the typical position in the destinations and other positions in the destinations are contrasted and stored. Thereby, even in case that a certain hot spring place is geographically wide for example, and the radio terminal enters the hot spring place before arriving at its typical position, and various kinds of information is needed from that time point, it is possible to utilize a distribution data from a time point when it arrives at a region of the hot spring place by using an error in a position. The destination specifying means specifies a destination to be visited out of the destinations stored in the longitude and latitude table. In case of the invention recited in claim 2, since the longitude and latitude or position coordinates are used, the longitude and latitude measuring means for measuring longitude and latitude at respective time points during movement of the radio terminal is required. The arrival time point detecting means detects a time point when a position measured by the longitude and latitude measuring means arrives within a range of the errors centering around the typical position of a corresponding destination stored in the longitude and latitude table, when the radio terminal moves to a destination specified by the destination specifying means. And, at this time point, the distribution data distributing means distributes a distribution data corresponding to the destination from the distribution data storing means.

In this manner, in the second invention, since the approach of the radio terminal to the destination is determined by the longitude and latitude measuring means, even in case that the movement of the mobile means such as an electric train and so forth is delayed so much for some reason and is too early to the contrary, it is possible to exactly distribute a distribution data. Also, since an error in accordance with a destination is corrected, even in case of the first arrival to any place in the destination, it is possible to certainly utilize the distribution data to be utilized at the destination from a time point of the arrival. Also, since the distribution data which is received when the destination is close is always used at the destination in future, there is no fear that a distribution data for the next destination is distributed at about the same time. Accordingly, it is possible to efficiently prevent situation from occurring, in which it takes much time to change electric trains due to a mistake of the received distribution data, and for example, by using a map of a wrong station.

In the third invention, a data distribution system comprises: (A) a mobile information table for storing reference required time periods which are references of required time periods required when a radio terminal moves to a destination that is a place of a destination of movement from departure places which are origins of the movement, respectively, and that is a place where utilization of information distributed in advance is conducted by means of the radio terminal, in accordance with mobile means which is used for movement; (B) movement specifying means for specifying departure places and destinations stored in this mobile information table in accordance with a movement schedule together with starting date and hour of the movement and the mobile means; (C) longitude and latitude measuring means for measuring longitude and latitude at respective time points during movement of the radio terminal; (D) error calculating means for successively calculating an error in time for date and hour which is a reference when the radio terminal arrives at a destination by comparing measurement values of this longitude and latitude measuring means with each other; (E) data distribution plan information generating means for obtaining date and hour when the radio terminal arrives at a destination from the respective departure places using the mobile means specified by the movement specifying means by correcting an error calculated by the error calculating means from the date and hour in case of using the reference required time periods, as date and hour when it arrives at the destination most quickly within a range of the error; (F) arrival time point detecting means for comparing arrival date and hour corrected for each destination, which is generated by this data distribution plan information generating means, with current date and hour, and detecting a time point when the radio terminal arrives at the respective destinations; (G) distribution data storing means for storing a data to be distributed to the radio terminal for every destination; and (H) distribution data distributing means for distributing a distribution data corresponding to a destination from the distribution data storing means every time the arrival time point detecting means detects arrival of the radio terminal at the respective destinations.

In other words, in the third invention, a table of the mobile information table is prepared, and in this table, the reference required time periods required when the radio terminal moves to the destination from the departure places are stored in accordance with the mobile means which is used for movement. Here, the destination is a place where utilization of information distributed in advance is conducted by means of the radio terminal. The movement specifying means specifies departure places and destinations stored in the mobile information table, and specifies starting date and hour of the movement and the mobile means. Thereby, standard date and hour or timing when the radio terminal arrives at the destination can be estimated. However, if a distribution data is distributed at the estimated time, in case that the mobile means such as a bus and so forth arrives there earlier, necessary distribution data has not been received yet at a time point when the radio terminal arrives at the destination, and this cannot be utilized. Also, in case that the arrival is delayed, the necessary distribution data is received fairly before, and if it competes with reception of other data, it becomes to be a cause of exerting pressure upon the memory of the radio terminal. Accordingly, in the invention recited in claim 3, the longitude and latitude measuring means is prepared, and longitude and latitude at respective time points during movement of the radio terminal are measured. Also, as an error calculating means, means is provided for successively calculating an error in time for date and hour which is a reference when the radio terminal arrives at a destination by comparing measurement values of the longitude and latitude measuring means with each other. As a result, by successively checking a position where the radio terminal exists to check its mobile velocity and current position, it becomes possible to successively correct arrival time which becomes a reference for the destination. The data distribution plan information generating means obtains date and hour when the radio terminal arrives at the destination most quickly within a range of an error by correcting an error calculated in this manner by the error calculating means. Accordingly, if the generation of the data distribution plan information generating means is closer to the arrival time to the destination, the generated data distribution plan information becomes correct more. The arrival time point detecting means compares arrival date and hour corrected for each destination, which is generated by the data distribution plan information generating means, with the current date and hour, and detects a time point when the radio terminal arrives at the respective destinations. The distribution data distributing means distributes a distribution data corresponding to the destination from the distribution data storing means every time the arrival time point detecting means detects arrival of the radio terminal at the respective destinations.

In this manner, the third invention has a form in which the first invention and the second invention are combined with each other, and the arrival scheduled time at the destination is corrected based on actual mobile condition of the radio terminal. Accordingly, even in case that some obstacle to the movement occurs like a case where an accident occurs on the way of the movement to a destination, and even in case that situation that the arrival is significantly too early occurs to the contrary, it is possible to distribute a distribution data with fairly high accuracy. Also, since the distribution data which is received when the destination is close is always used at the destination in future, there is no fear that a distribution data for the next destination is distributed at about the same time. Accordingly, it is possible to efficiently prevent situation from occurring, in which it takes much time to change electric trains due to a mistake of the received distribution data, and for example, by using a map of a wrong station.

In the fourth invention, in addition to the data distribution system, it is characterized in that the system further comprises an error table for representing a standard error of dispersion in time of arrival from a departure place to a destination in accordance with the mobile means, and a coefficient table for storing variation coefficients of an error in date and hour at departure, and the error calculating means calculates an error by multiplying a corresponding error described in the error table by the variation coefficients of an error in date and hour at departure.

In other words, in the fourth invention, the error table and the coefficient table are prepared, and since an error is calculated by selecting the coefficients and multiplying the error shown in the error table by the selected coefficients, accuracy of a value of the error is improved, and in addition, even for a new kind of error and a kind of error to be corrected, a double feature of a value and a coefficient of the error, which are basis, can be considered, and thereby, it becomes easy to take measures.

In the fifth invention, in the data distribution system, it is characterized in that the variation coefficients of an error in the date and hour are different from each other dependent upon a day.

In other words, in the fifth invention, a day is raised as one of the elements for the variation of the error. Other than this, by means of a date such as $5^{th}$ day and $10^{th}$ day, and a season or opening of a festival in a region, the error varies. By setting the error by an appropriate value for such a day, it is possible to calculate arrival time with higher accuracy, and it becomes possible to distribute a distribution data at appropriate timing.

In the sixth invention, the data distribution system further comprises an overwrite means for overwriting the distribution data distributed when the said radio terminal arrived at a previous destination by the distribution data distributed when the above-mentioned radio terminal arrived at the new destination.

In other words, in the sixth invention, by overwriting a distribution data every time the radio terminal arrives at a destination, the distribution data can be stored at maximum even in a comparatively less memory region, and efficient utilization of the memory region can be realized.

In the seventh invention, in the data distribution system, it is characterized in that the mobile information table is suitably updated by means of the newest information.

In other words, in the seventh invention, the mobile information table can be updated by means of the newest information and so forth of the day. Since the error is corrected by such the newest data, it becomes possible to distribute a distribution data at more correct timing.

BRIEF DESCRIPTION OF THE DRAWINGS

This and other objects, features and advantages of the present invention will become more apparent upon a reading of the following detailed and drawings, in which:

FIG. 4 is a table arrangement view representing a part of mobile plan information input to a mobile plan information input section in this embodiment;

FIG. 5 is an explanation view representing one example of an error table stored in an error table memory section;

FIG. 6 is a block diagram showing each component in the distribution center of this embodiment, and data and control signals transferred there between;

FIG. 8 is an explanation view representing one example of the contents of a coefficient table in this embodiment;

FIG. 10 is an explanation view representing one example of an arrangement of a data distribution plan information storage table in this embodiment;

FIG. 13 is an explanation view representing a part of an error table which is used in the modified example;

FIG. 16 is an explanation view representing one example of an arrangement of a data distribution plan information storage table which is used in the modified example and FIG. 17 is a flow chart representing a flow in the modified example of distribution processing by means of the data transmitting section shown at STEP S139 in FIG. 3.

DESCRIPTION OF THE EMBODIMENTS

Embodiments of the present invention will be explained in detail below.

Figure 1:
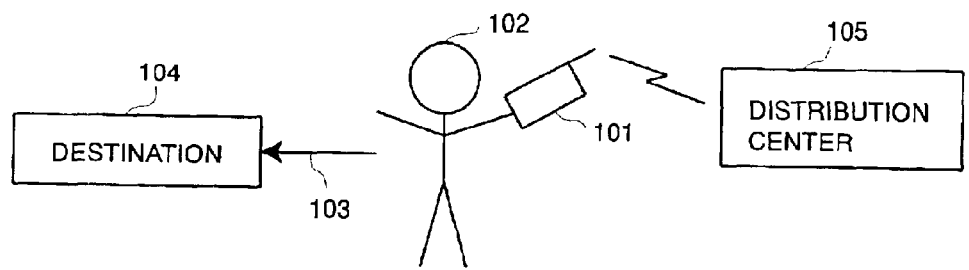
FIG. 1 is a principle view representing a principle arrangement of a data distribution system in one embodiment of the present invention.

FIG. 1 represents a principle arrangement of a data distribution system in one embodiment of the present invention. A user 102 of a mobile type telephone set 101 that: is a radio terminal is moving in a direction along an arrow 103 by himself or herself or by means of transport facilities (not shown). Before the user arrives at a predetermined destination 104 such as a station and a historic site, information in relation thereto is sent to the mobile type telephone set 101 from a distribution center 105. Accordingly, the user 102 can receive explanation about the destination 104 by means of the mobile type telephone set 101. For example, in case that the destination 104 is a station, information about a platform for a transfer and a place where station lunch is sold can be utilized when the user arrives at the station.

In case of a historic site, the user can receive explanation about the historic site by reading information sent to the mobile type telephone set 101 and listening to voice information without requiring a guide. Also, in case that the user 102 moves to the next destination of movement, information that the user can move in which direction is provided. After that, the next information is provided to the mobile type telephone set 101 from the distribution center 105 at a time point when the user arrives at a place (landmark) where the next information should be referred to. The rest is the same.

Figure 2:
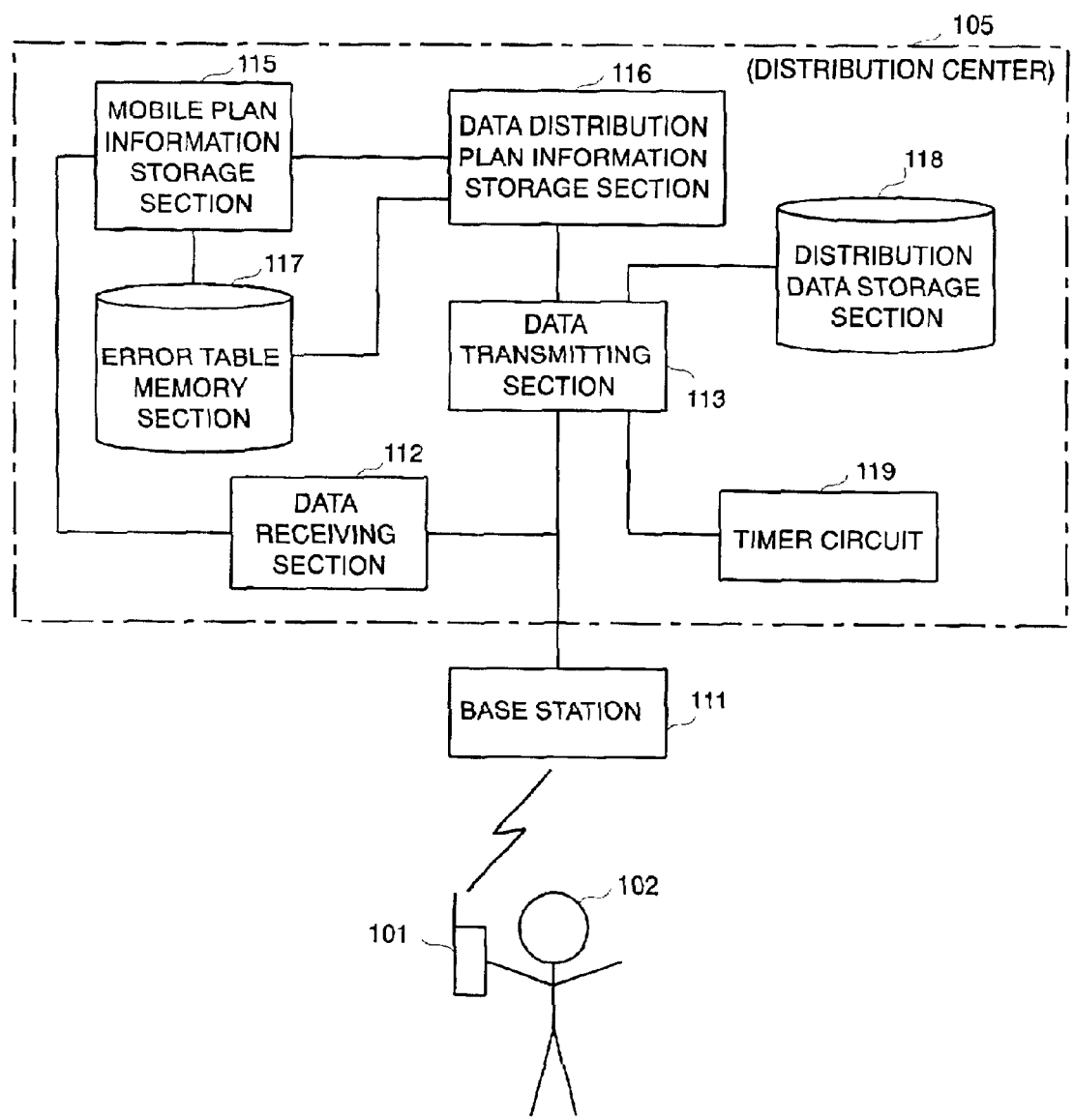
FIG. 2 is a functional arrangement view of a system centering around a distribution center constituting the data distribution system in this embodiment.

FIG. 2 shows a functional arrangement centering around a distribution center of such a data distribution system. The user 102 of the system operates the mobile type telephone set 101, and can conduct transmission and reception of a data to and from the distribution center 105 by way of a base station 111. In the distribution center 105, a data receiving section 112 for receiving a data from the mobile type telephone set 101, and a data transmitting section 113 for transmitting data to the mobile type telephone set 101 are provided.

As explained in FIG. 1, it is assumed that the user 102 moves somewhere and, at a destination of the movement, wants to obtain information about the destination of the movement. In this case, the user 102 operates the mobile type telephone set 101 and inputs mobile plan information thereto. This mobile plan information is input to a data receiving section 112 in the distribution center 105 from the base station 111 and is received. This received data is stored in a mobile plan information storage section 115. The stored information is a departure place and a destination of movement, and starting time of movement and mobile means. Here, the mobile means indicates a vehicle used for movement, and an action taken until the user 102 arrives at a destination of movement. In addition, the user 102 does not necessarily input such information one by one, and the current place (departure place) and a destination of movement (destination) can be selected from information of preset places under condition in which the user has access to the distribution center 105, and similarly, departure date and hour and mobile means can be selected from the contents shown on a display screen (not shown). Thereby, without taking time, an input operation is made quickly.

The input data stored in the mobile plan information storage section 115 is read out at predetermined timing by a CPU (Central Processing Unit) (not shown) constituting this distribution center 105, and is sent to a data distribution plan information storage section 116. At this time, an error table memory section 117 obtains information on movement from the mobile plan information storage section 115, and outputs an error in time, which is associated therewith, as an error data. For that, the error table memory section 117 stores an error table (not shown) which statistically represents various kinds of errors in time in association with movement. Similarly, the error data is sent to the data distribution plan information storage section 116. The data distribution plan information storage section 116 subtracts an error time period out of data represented as an error data, after which arrival will be earlier, from scheduled time when the user arrives at a destination of movement, and generates data distribution plan information. For example, it is assumed that departure time is ten o'clock in the morning, and that a standard value of a movement time period to a destination of movement by bus is two hours. In this case, if an error is twenty minutes, which is one corresponding to an earlier case of time periods until arrival of its movement route and movement time band, eleven forty that is calculated by adding a time period to ten o'clock in the morning, which is obtained by subtracting twenty minutes from two hours of the standard value, is the earliest time when the user arrives at a destination of movement.

On an output side of the data distribution plan information storage section 116, the data transmitting section 113 is placed. The data transmitting section 113 is connected to a distribution data storage section 118. The distribution data storage section 118 takes information necessary for the user 102 via data access means (not shown). Out of the information, the data transmitting section 113 selects information which will be necessary when the user 102 arrives at a destination of movement, and starts transmission so that transmission of the information will be completed at its arrival scheduled time (in the above example, at eleven forty). For that, a timer circuit 119 is used. In case that control of the transmission is not conducted sequentially, instead a clock circuit for setting transmission timing at time can be provided.

Figure 3:
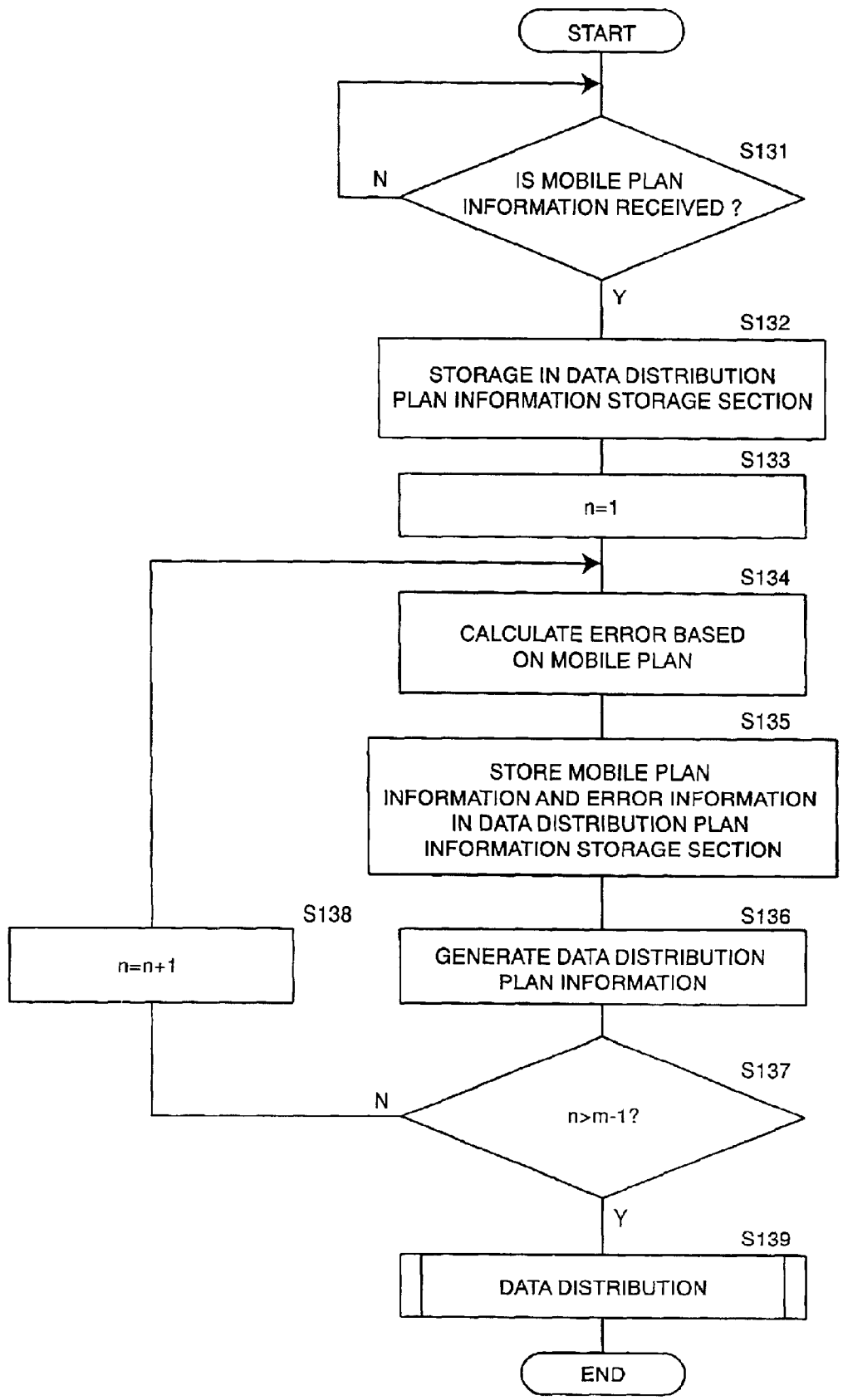
FIG. 3 is a flow chart representing an outline of processing in the data distribution system of this embodiment.

FIG. 3 represents a flow of the above processing. The above-described CPU conducts this processing based on a program stored in a storage media (not shown). First, the CPU monitors timing at which the mobile plan information is received by the data receiving section 112 (STEP S131). When the mobile plan information is received (Y), the CPU stores this in the data distribution plan information storage section 116 (STEP S132).

FIG. 4 represents a part of the mobile plan information input to the mobile plan information input section. Here, the mobile plan information is stored in a mobile plan information table 151 in a table form. A symbol # (sharp) described in a column on a most left side in this mobile plan information table 151 represents each item of movement of the user 102, and here, numbers are attached in order of earlier time. The next column is a "date", and a date of movement is input. The next column is "time", and time when movement is started is described. The next column is a "place", that is, a destination. Information such as "T00231" shown in the column of the "place" is a destination code representing a destination. The next column is "mobile means", and mobile means such as transport facilities and walking is input. The last column indicates a "distribution data". This indicates which distribution data stored in the distribution data storage section 118 is made available at a destination of movement.

After the mobile plan information as such a received data is stored in the mobile plan information storage section 115 shown in FIG. 2, a parameter n for showing a value of an item to be processed out of the items described in the mobile plan information table 151 is set to "1" (STEP S133 in FIG. 3). And, an error during movement along a movement route described in the n-th, that is to say, the first item is calculated (STEP S134). It is described before that, for that, the error table memory section 117 is used.

FIG. 5 represents one example of an error table stored in the error table memory section. As a statistical value, an error table 161 describes an error (reference error) as a reference value, which can be generated for each kind of mobile means. In case that the mobile means is an "electric train" for example, when a domestic case in Japan is considered as an example, an error of time itself necessary for movement is much less. Accordingly, an error of a time period necessary for a transfer is taken into account, and the reference error is set to five minutes. On the contrary, in case that the mobile means is a "bus", the reference error is set to ten minutes. The rest is the same. The reason why a reference error in a case where party travelers leave a hotel is less than that in a case where an individual leaves a hotel is that a case is taken into account, in which there is situation such as regular departure and a less probability of making a call in a case where a collective action is taken.

Returning to FIG. 3 again, explanation will be continued. After the error during the movement along the movement route is calculated, this error information and mobile plan information are stored in the data distribution plan information storage section 116 (STEP S135). And, by subtracting an error out of errors, which makes arrival time earlier, from arrival scheduled time out of the mobile plan information, data distribution plan information is generated (STEP S136). After the above processing is completed, the CPU checks whether there are any remaining items shown in FIG. 4 (STEP S137). In other words, assuming that the number of all items in the mobile plan information table 151 of the user 102 is m (m is a positive integer.), determination on whether a parameter n is larger than a value obtained by subtracting "1" from a value m is conducted. In case that a plurality of items are described, n is not large at a step where this first item is processed (N). Accordingly, in this case, the parameter n is counted up by "1"(STEP S138). And, returning to the STEP S134 again, the similar processing is conducted for the next item (STEP S134-S137).

After processing of all items described in the mobile plan information table 151 is completed in this manner (STEP S137:Y), data distribution processing for the first item is conducted (STEP S139).

In addition, in case that it is necessary to distribute data of a plurality of items at one destination of movement, a time period for the distribution needs a certain finite period of time, and there is a case where a probability that a situation occurs, under which the user has arrived at a destination of movement at a time point when reception of the last item is completed. This is determined by a relation between capacity of a memory provided in the mobile type telephone set 101 and transfer speed of a data, and in a case that the capacity of the memory is less or the transfer speed is high, there are many cases which do not need such consideration actually. In a case that the capacity of the memory is comparatively large and the transfer speed is slow, it is necessary to make time when distribution of data of the first item is started slightly earlier, which depends on quantity of data to be sent to the mobile type telephone set 101 from the distribution center 105. Such consideration can be understood when the mobile plan information storage section 115 to which the mobile plan information table 115 is input first or the data distribution plan information storage section 116 which is provided at a backward stage thereof checks a relation between arrival time and the items or a data size of the distribution data in advance.

As mentioned above, an outline of the operation of the data distribution system of this embodiment was explained. Next, a further particular arrangement of the distribution center will be shown, and some processing such as the processing for the calculation of the error in the STEPs shown in FIG. 3 will be further explained particularly.

Figure 6:
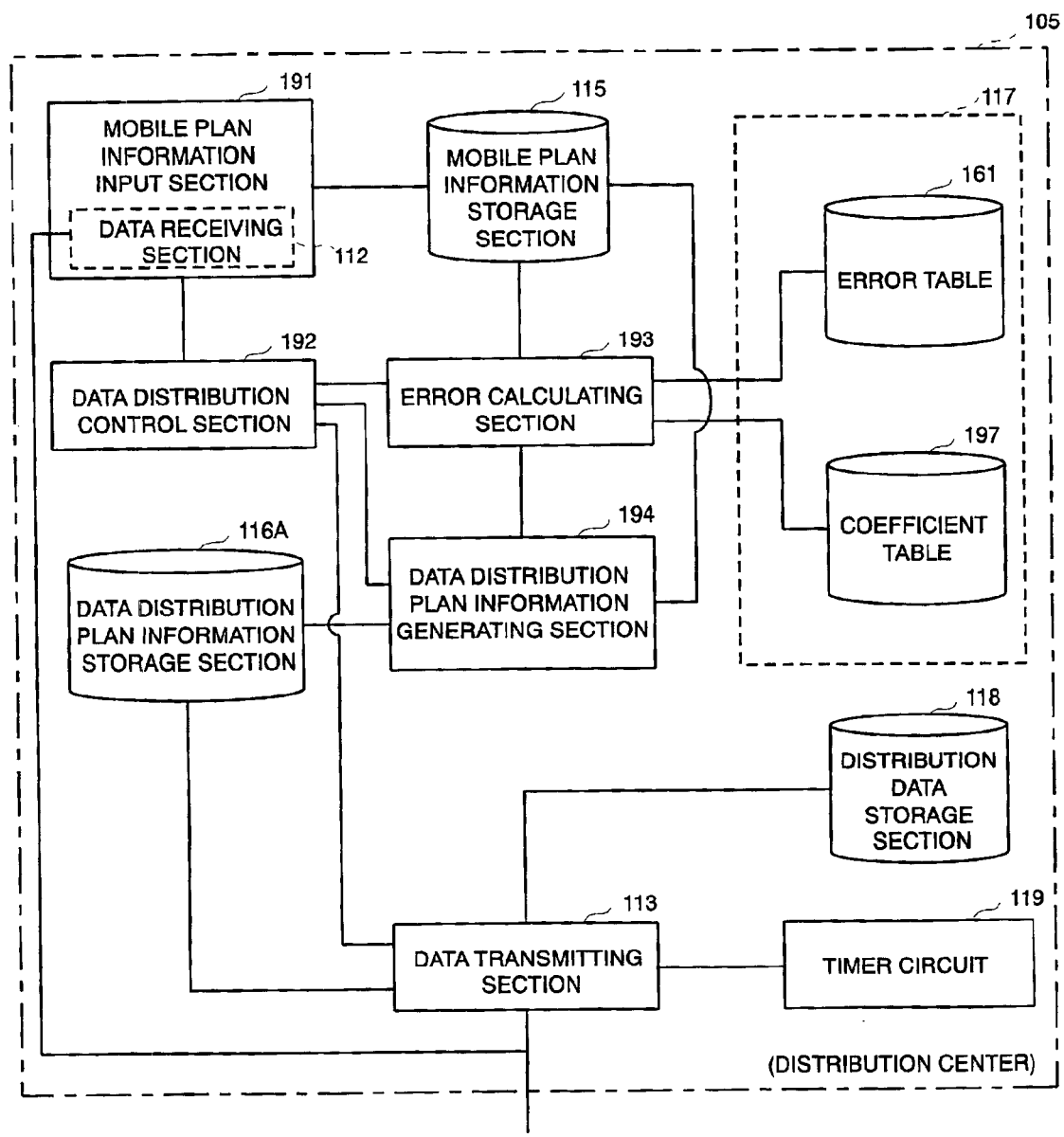

FIG. 6 shows each component in the distribution center, and data and control signals transferred therebetween. The same numerals are attached to the same components as those in FIG. 2. The data receiving section 112 shown in FIG. 2 exists as a part of a mobile plan information input section 191. In the mobile plan information input section 191, the user 102 shown in FIG. 1 and so forth not only can input data using the mobile type telephone set 101, but also can input various kinds of data using a pointing device such as a keyboard and a mouse (not shown) or a microphone for a voice input. A data distribution control section 192 is a part for conducting entire control, and communication of control data is conducted between the mobile plan information input section 191, and an error calculating section 193, a data distribution plan information generating section 194 and a data transmitting section 113. The error calculating section 193 is connected to an error table 161 and a coefficient table 197 which constitute an error table memory section 117. These error table 161 and coefficient table 197 divide memory regions of a memory device (not shown) such as a hard disk and an optical disk, and use them together with a mobile plan information storage section 115, a data distribution plan information storage section 116A and a distribution data storage section 118. Of course, dependent upon an arrangement of the distribution center 105, independent memory devices can be allocated to those, respectively, and the memory devices can be made independent of each other for a part of those.

The data distribution plan information generating section 194 obtains mobile plan information from the mobile plan information storage section 115, and obtains an error calculated by the error calculating section 193 and generates data distribution plan information which becomes a plan for distributing data, and stores this in the data distribution plan information storage section 116A. Accordingly, the data distribution plan information storage section 116 shown in FIG. 2 includes both the data distribution plan information storage section 116A and the data distribution plan information generating section 194 shown in FIG. 6.

Figure 7:
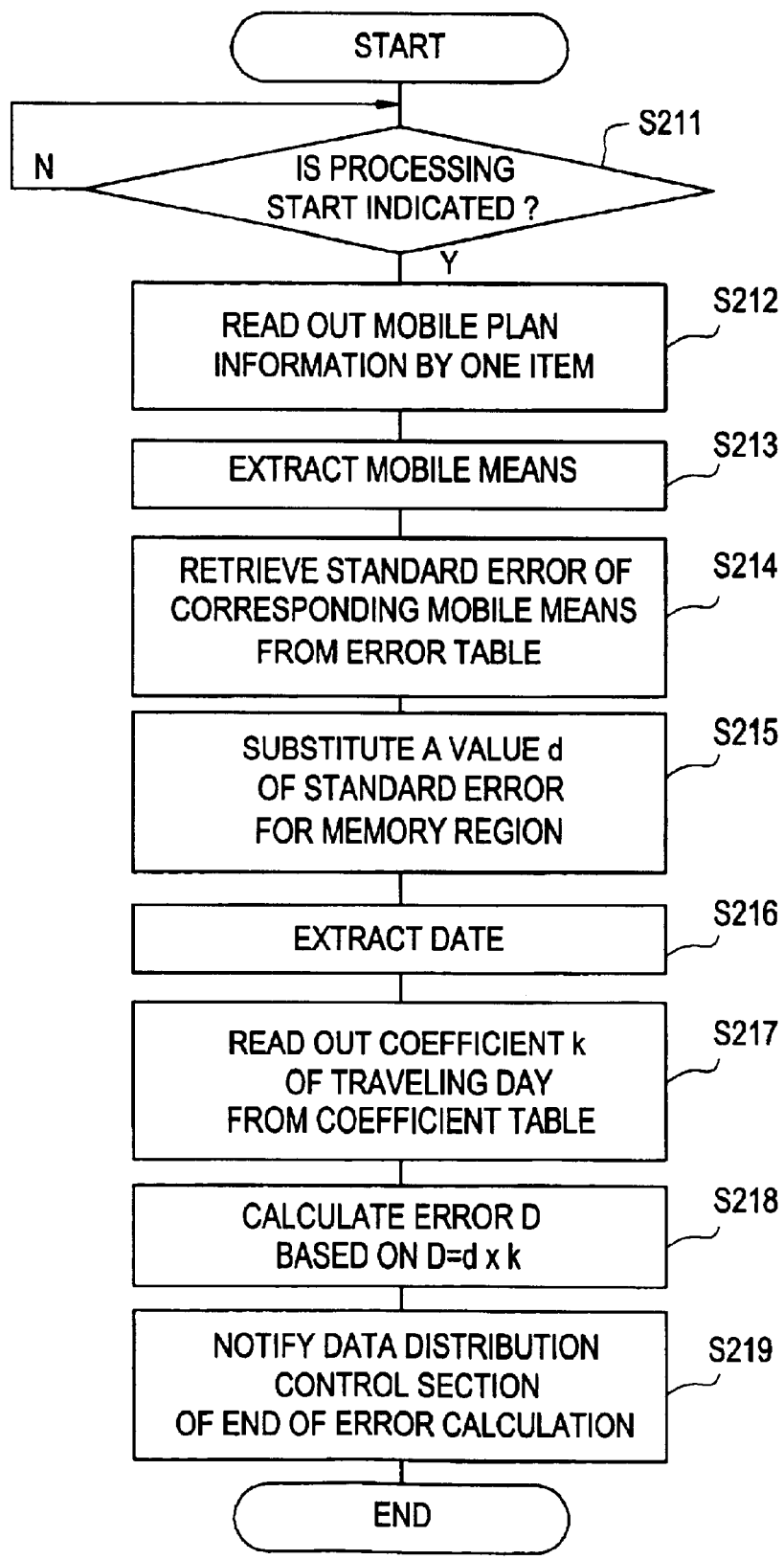
FIG. 7 is a flow chart particularly representing a flow of processing for calculating an error shown at STEP S134 in FIG. 3.

FIG. 7 particularly represents a flow of processing for calculating the error shown at STEP S134 in FIG. 3. When receiving a control signal for indicating processing start from the data distribution control section 192 (STEP S211:Y), the error calculating section 193 starts processing for the indicated item. First, the error calculating section 193 reads out the mobile plan information stored in the mobile plan information storage section 115 by one item out of corresponding items (STEP S212). And, from this record, a data of a column of a "mobile means" is extracted (STEP S213). If mobile plan information of the first item in the mobile plan information table 151 shown in FIG. 4 is read out, the extracted "mobile means" is an "electric train (TRAIN)". Accordingly, in this case, from the error table 161 shown in FIG. 5, a reference error for a "movement by electric train (TRAIN)" is retrieved (STEP S214), and it is understood that this is five minutes (00:05).

The error calculating section 193 substitutes a value d of the obtained reference error for a predetermined memory region on a RAM (not shown; Random Access Memory) (STEP S215). Next, the error calculating section 193 extracts a "date" as a movement day out of the mobile plan information read out at the STEP S212 (STEP S216). In a case of this example, the movement day is Apr. 7, 2000. Accordingly, the error calculating section 193 reads out a coefficient corresponding to this movement day from the coefficient table 197 (STEP S217).

FIG. 8 represents one example of the contents of the coefficient table. In the coefficient table 197, days and coefficients are defined in accordance with the respective movement days. This depends on a difference in error ranges for an error (a standard error) that becomes a standard, based on that the day is which day in one week. Since the coefficient table 197 of this embodiment sets coefficients in accordance with a date (movement day), it is constructed so that the coefficients can be set in accordance with a primary factor on whether it is a public holiday and a day of which season. Since the coefficient is a multiplier for a value d of the standard error, "1.0" is assumed to be a value which does not have an error. After a coefficient k is read out, the error calculating section 193 calculates an error D by multiplying the value d of the standard error by the coefficient k (STEP S218). In this example, it becomes the following equation (1):

$$D = d \times k \quad (1)$$
$$= 5 \text{ (minutes)} \times 1.0 = 5 \text{ (minutes)}$$

After calculating the error D for a predetermined mobile means in this manner, the error calculating section 193 notifies the data distribution control section 192 that the calculation processing of the error for one item has been completed (STEP S219), and this processing ends (END). In addition, in case that the mobile plan information stored in the mobile plan information storage section 115 is covering a plurality of items, the error calculating section 193 reads out mobile means for the indicated item every time start of processing is indicated at the STEP S211, and similarly calculates the error D.

Figure 9:
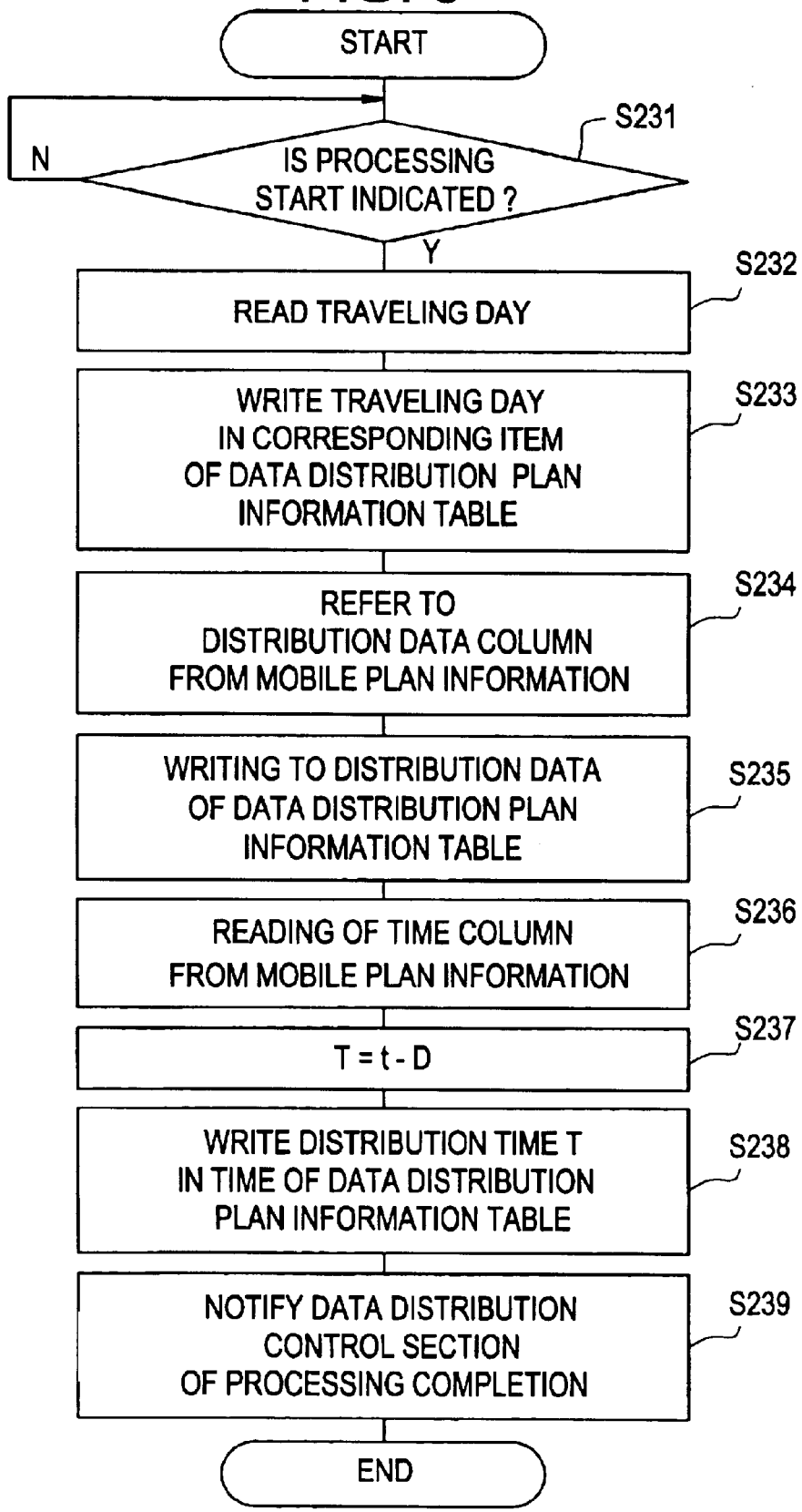
FIG. 9 is a flow chart representing condition of generation processing of data distribution plan information in this embodiment.

FIG. 9 represents condition of generation processing of the data distribution plan information. After the error calculation processing shown in FIG. 7 ends, and if receiving notification of the end of the error calculation from the error calculating section 193, the data distribution control section 192 shown in FIG. 6 indicates start of processing of a predetermined item to the data distribution plan information generating section 194 (STEP S231). The data distribution plan information generating section 194 receives the indication of the data distribution control section 192 and starts an operation, and reads out a "movement day (date)" of the data distribution plan information storage table stored in the data distribution plan information storage section 116A (STEP S232).

FIG. 10 represents one example of an arrangement of the data distribution plan information storage table. The data distribution plan information storage table 251 is a table having each column of a movement day (date), time and a distribution data. Here, processing in which the first item (record) of this data distribution plan information storage table 251 is written will be raised as an example. The data distribution plan information generating section 194 shown in FIG. 6 refers to a data "2000. 04. 07" as a corresponding "movement day (date)" in the mobile plan information table 151 of the mobile plan information storage section 115 (STEP S232). And, by using this, the data distribution plan information generating section writes it in the column of the "movement day (date)" in the data distribution plan information storage table 251 (FIG. 10) (STEP S233). Next, the data distribution plan information generating section 194 refers to a corresponding "distribution data" column in the mobile plan information table 151 of the mobile plan information storage section 115 (STEP S234), and writes "STA_TOYAMA. bmp" thereof in the column of the "distribution data" in the data distribution plan information storage table 251 (FIG. 10) (STEP S235).

Next, the data distribution plan information generating section 194 reads a data "06:00" as corresponding "time" in the mobile plan information table 151 of the mobile plan information storage section 115 (STEP S236). And, the data distribution plan information generating section 194 calculates distribution time T when distribution is actually conducted by means of the following equation (2) (STEP S237):

$$T = t - D \quad (2)$$

Here, t represents time "06:00" of the mobile plan information. In other words, the distribution time T becomes a value obtained by subtracting the error D from the time t for the mobile plan information. The calculated distribution time T is written in the column "time" in the data distribution plan information storage table 251 (STEP S238). Here, distribution time T of "05:55" is written. After the above processing is completed, the completion of the processing is notified to the data distribution control section 192 from the data distribution plan information generating section 194 (STEP S239).

Figure 11:
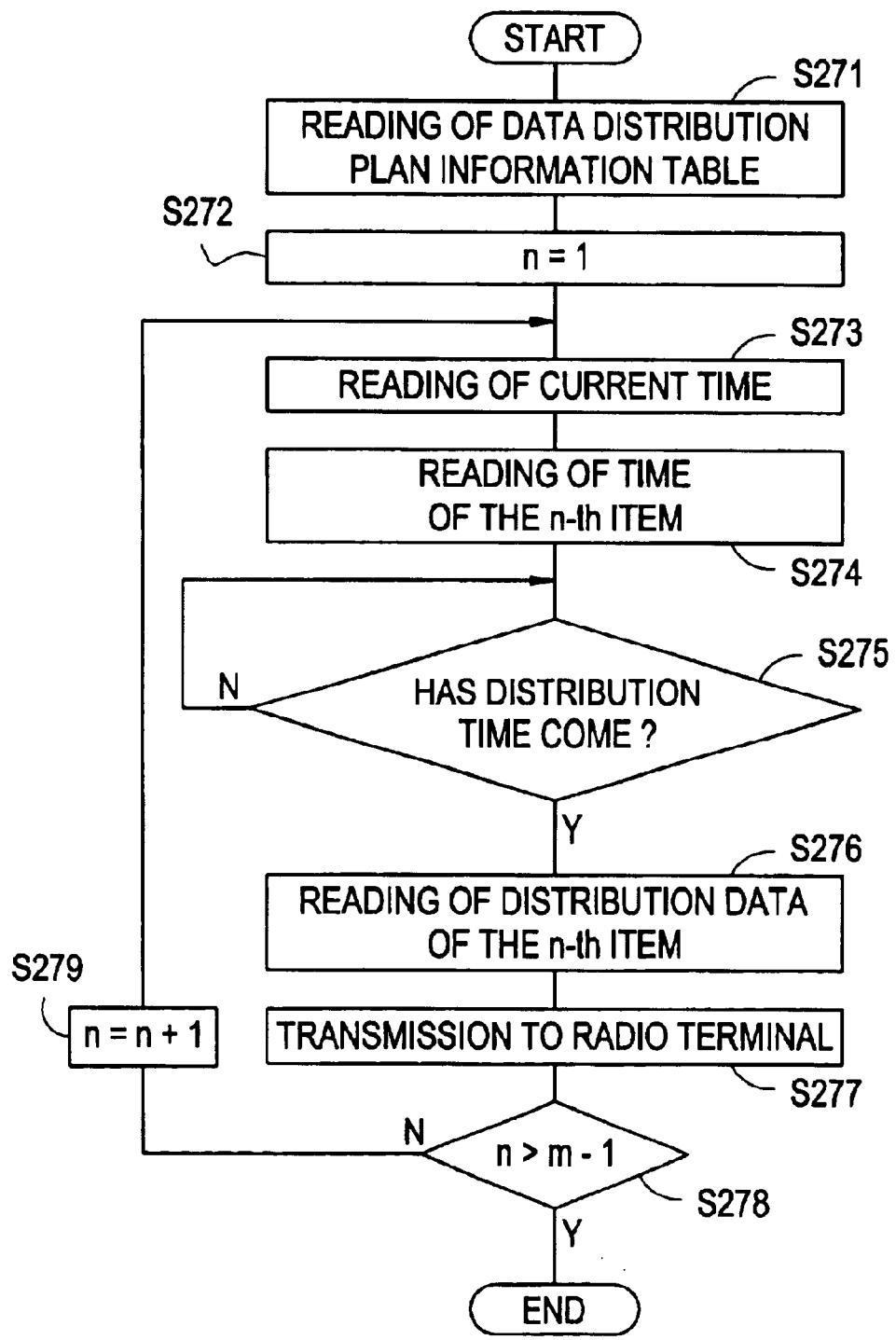
FIG. 11 is a flow chart representing a flow of distribution processing by means of a data transmitting section shown at STEP S139 in FIG. 3.

FIG. 11 represents a flow of the distribution processing by means of the data transmitting section shown at STEP S139 in FIG. 3. If receiving the notification (STEP S239 in FIG. 9) of the processing completion from the data distribution plan information generating section 194, the data distribution control section 192 indicates start of processing to the data transmitting section 113. Based on this, the data transmitting section 113 conducts reading of the data distribution plan information storage table 251 (FIG. 10) (STEP S271). Next, it initializes a parameter n and sets it to "1" (STEP S272), and conducts reading of the current time (STEP S273). And, it conducts reading of the "time" column in the n-th, that is to say, first item in the data distribution plan information storage table 251 (STEP S274 ). Here, it is "05:55" (five fifty-five in the morning). Then, a difference between the time read at the STEP S273 and the reading of the "time" column is set in a timer circuit 119, and whether the distribution time comes is monitored (STEP S275). For example, at five fifty-three in the morning, the distribution time has not come yet. Instead of counting up the time difference in the timer circuit 119 and monitoring the arrival of the distribution time in this manner, it can be possible to sequentially conduct comparison between the current time and the time of the "time" column, which was read.

When the time read in the "time" column has come (STEP S275:Y), a "distribution data" shown in the first item of the data distribution plan information storage table 251 is read from the distribution data storage section 118 (STEP S276). And, this is transmitted to the mobile type telephone set 101 that is a radio terminal of the user 102 shown in FIG. 2. (STEP S277). In this manner, the reading of the "distribution data" and the transmission in accordance therewith to the mobile type telephone set 101 are conducted at five fifty-five in the morning, in which an error is taken into account for the scheduled time, and the user 102 receives the data to be utilized at Toyama station until six in the morning when the user arrives at the Toyama station.

The data transmitting section 113 successively conducts the distribution to each user time-sequentially, and however, if only a series of distribution work to the user 102 in this embodiment is focused, thereafter, whether a value n is larger than "m−1" is checked (STEP S278). In case that it is not larger (N), there are still remains in the distribution work for the mobile type telephone set 101 of this user 102. Accordingly, the value n is counted up by "1"(STEP S279), and the flow returns to the processing at the STEP S273 again and preparation for the next distribution is conducted. And, reading of the "time" column in the n-th, that is to say, second item in the data distribution plan information storage table 251 is conducted (STEP S276). In this manner, if the time has come, the distribution of the distribution data is conducted. The distribution work for the user 102 goes forward below in the same manner, and if the value n becomes larger than "m−1" at STEP S278 (Y), the distribution work for the user 102 ends (END).

[Modified Example]

In the embodiment explained above, by setting time as a reference, the timing of the distribution to the radio terminal is set. In a modified example of the present invention, a place of the radio terminal is detected to obtain an error from a destination, and information necessary at the destination is distributed to the user similarly before the user arrives at the destination.

Figure 12:
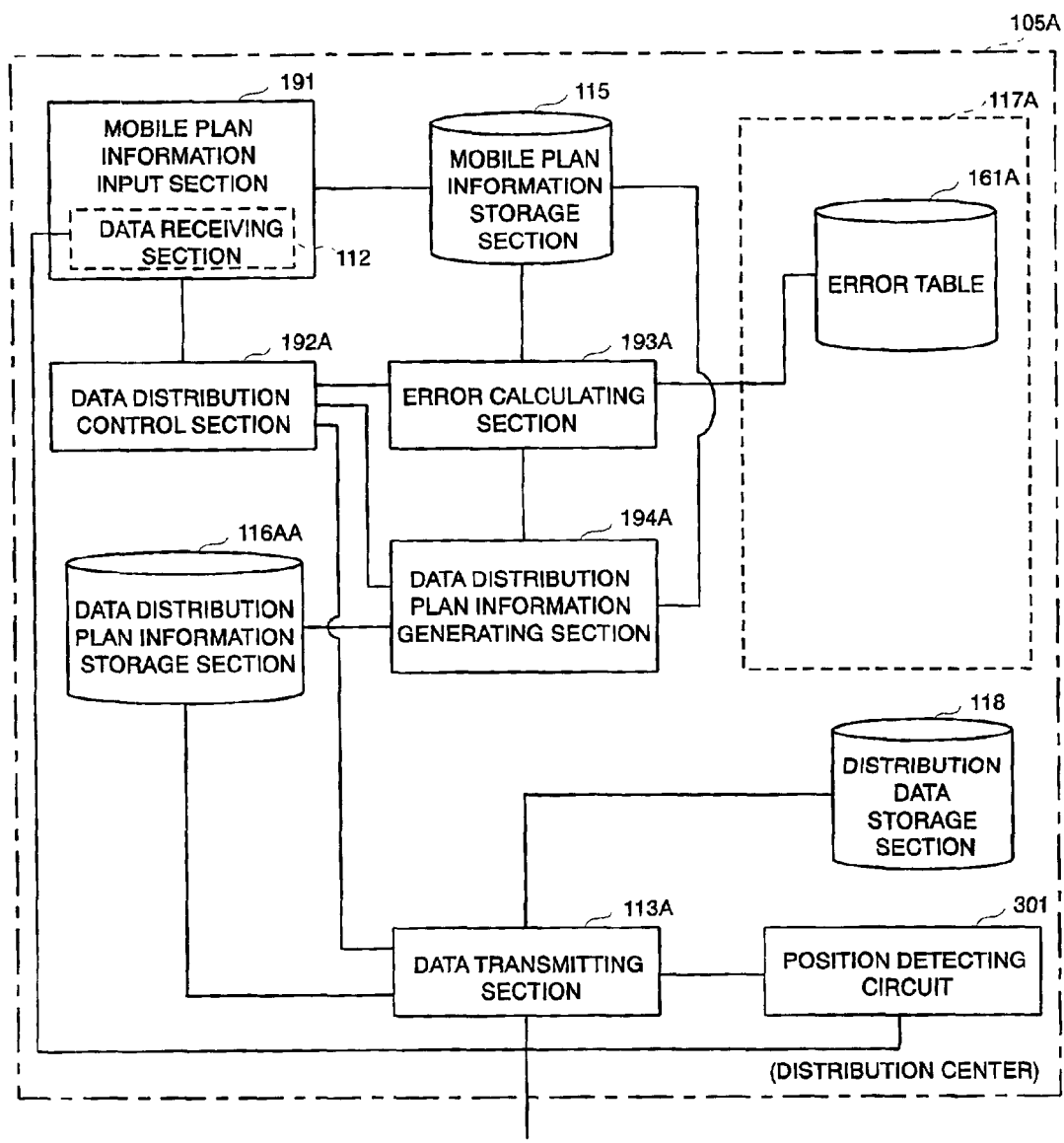
FIG. 12 is a block diagram representing an arrangement of a distribution center in a modified example.

FIG. 12 represents an arrangement of the distribution center in this modified example. In FIG. 12, the same numerals are attached to components same as those in FIG. 6 of the previous embodiment, and explanation thereof will be suitably omitted. A distribution center 105A has a different arrangement such as an error table memory section 117A and an error calculating section 193A for calculating an error. Also, instead of the timer circuit 119 in the previous embodiment, a position detecting circuit 301 is provided. The position detecting circuit 301 receives position information from the mobile type telephone set 101 that is a radio terminal, and makes it input to a data transmitting section 113A. In addition, the position information from the mobile type telephone set 101 is determined based on a position of the base station 111 (Refer to FIG. 2.) connected to the mobile type telephone set 101 or position detection information by means of a GPS (Global Positioning System) of the mobile type telephone set 101.

FIG. 13 represents a part of an error table which is used in this modified example. In a second error table 161A, each destination (place), longitude and latitude as position information thereof, and errors for those destinations are described. Different from the previous embodiment, an error is set in accordance with situation of the destination. For example, an error of a "Toyama station" is "0.01", and an error of "Nanao Onsen" which is the next destination is "0.05" fifth as large as this is caused by an area from a center of those places. In case of a station, the area is mainly determined by length of a platform and an inside shopping district. For example, although "Toyama station" is represented by a position of one hundred thirty seven degrees twelve minutes fifty eight seconds five of east longitude, and thirty six degrees forty one minutes fifty four seconds zero of north latitude, there are many cases in which this indicates a center point of "Toyama station". Since, dependent upon an arrival platform, an electric train arrives at the platform before the user arrives at this displayed position, by taking such situation into account, it is necessary to distribute a data at a time point when the user arrives at a place this side of a departure place. The reason why an error of "Nanao Onsen" is larger is that, since it represents a hot spring district or one town or an entire area, the user enters a territory of "Nanao Onsen" before arriving at its center portion or a typical stop position of a bus and so forth.

Information of "T00231" and so forth shown in a column of a "place" in the second error table 161A is a destination code representing a destination. In other words, the destination code shown in the column of the "place" shown in FIG. 4 is set as a key, and the second error table 161A is retrieved. Since the error of "Toyama station" is "0.01", a range of zero degree zero minute one second is an error for the position of one hundred thirty seven degrees twelve minutes fifty eight seconds five of east longitude, and thirty six degrees forty one minutes fifty four seconds zero of north latitude, which is a reference. Namely, the data distribution plan information generating section 194 generates data distribution plan information so that, with respect to an electric train which arrives at "Toyama station", distribution of a data is conducted at a time point when the radio terminal (the mobile type telephone set 101 of the user 102) arrives at a place before zero degree zero minute one second, and stores it in a data distribution plan information storage section 116AA. A data transmitting section 113A conducts the distribution of a data to be distributed at a time point when it is detected that the mobile type telephone set 101 comes to the above-described place.

Figure 14:
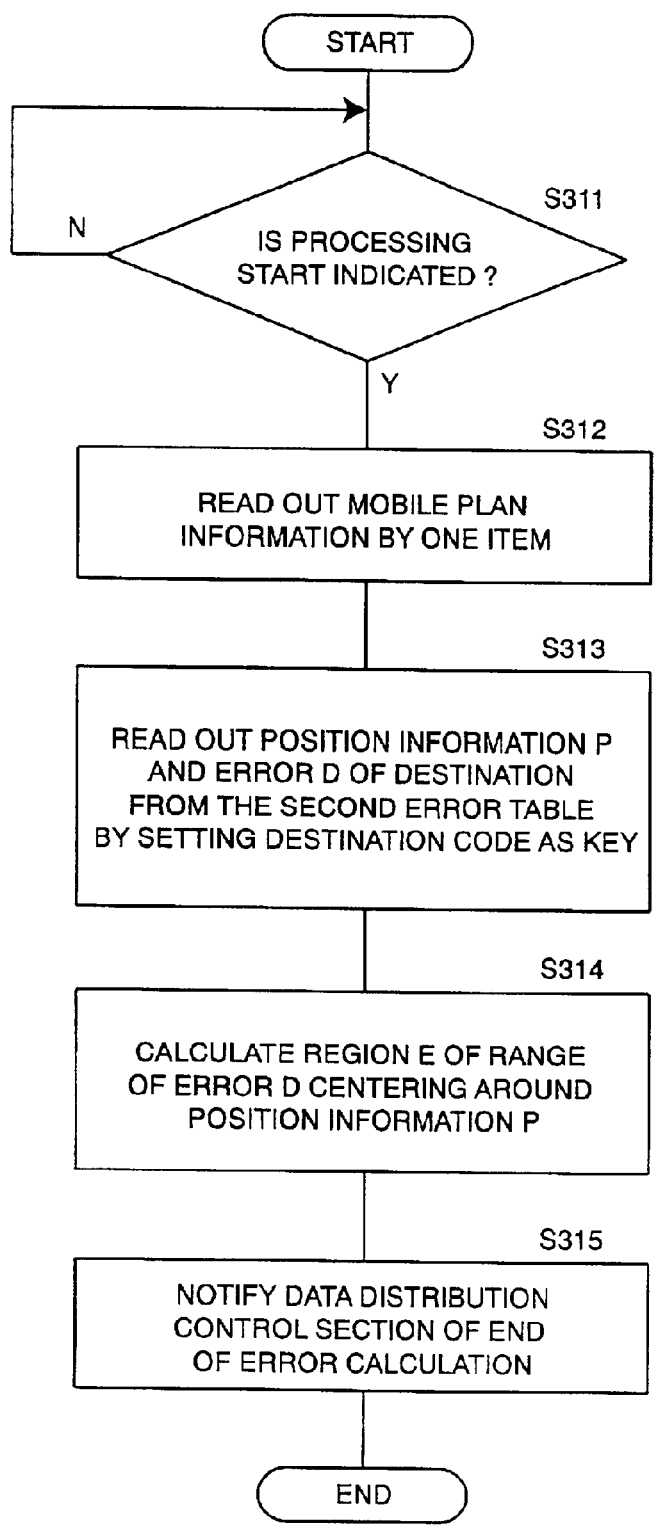
FIG. 14 is corresponding to FIG. 7 of the previous embodiment, and is a flow chart particularly representing a flow in the modified example of processing for calculating an error shown at STEP S134 in FIG. 3.

FIG. 14 is corresponding to FIG. 7 of the previous embodiment, and particularly represents a flow in the modified example of the processing for calculating the error shown at STEP S134 in FIG. 3. When receiving a control signal for indicating processing start from the data distribution control section 192 A (STEP S311:Y), the error calculating section 193A starts processing for the indicated item. First, the error calculating section 193A reads out the mobile plan information stored in the mobile plan information storage section 115 by one item out of corresponding items (STEP S312). And, from this record, a destination code is set as a key, and position information P and an error D of a destination are read out from the second error table 161A (STEP S313). Next, a circular region E in a range of the error D centering around the position information P is calculated (STEP S (STEP S314). After the region E is obtained in this manner, the end of the error calculation is notified to the data distribution control section 192A (STEP S315).

Figure 15:
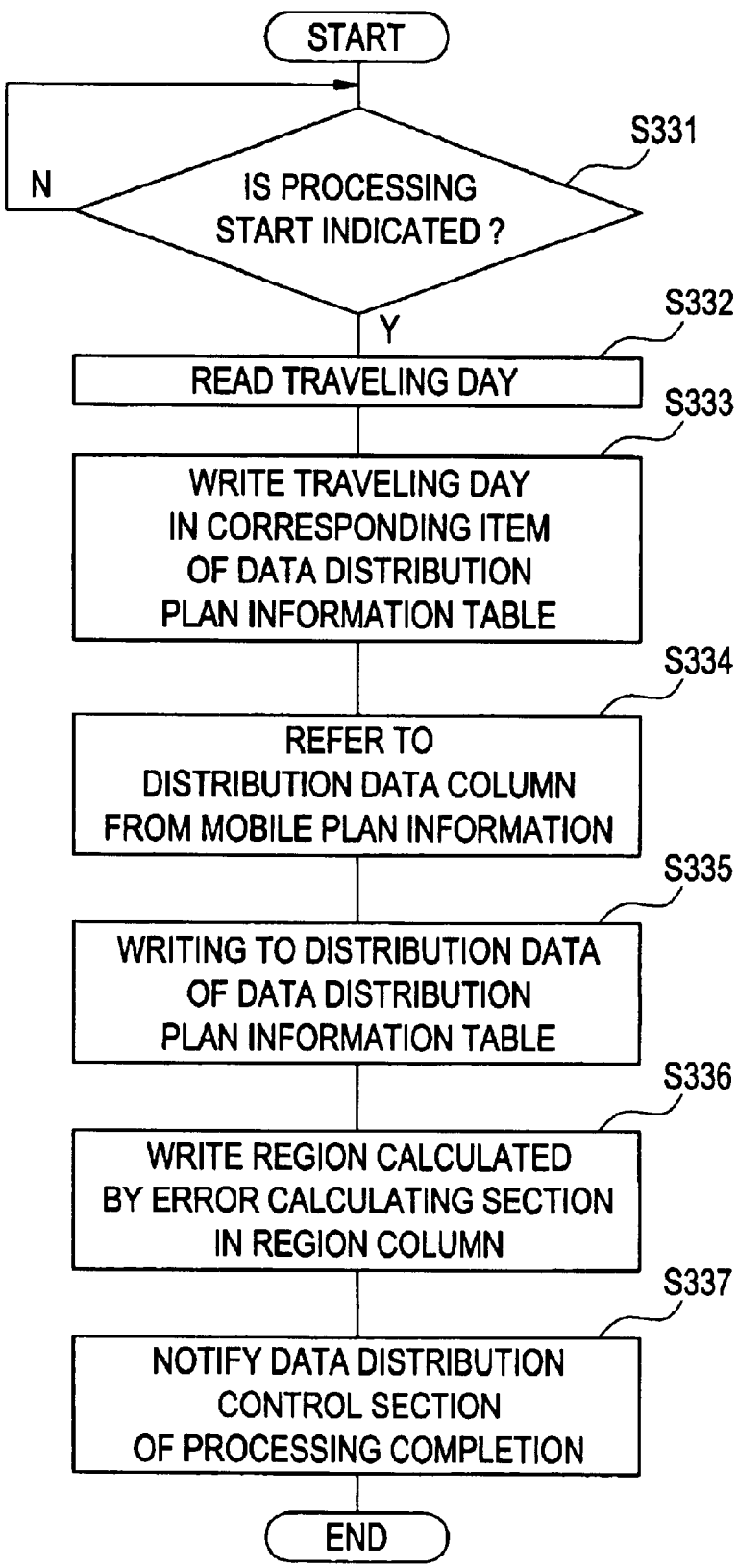
FIG. 15 is a flow chart representing condition of generation processing of data distribution plan information in the modified example.

FIG. 15 represents condition of generation processing of the data distribution plan information. After the error calculation processing shown in FIG. 14 ends, and if receiving notification of the end of the error calculation from the error calculating section 193A, the data distribution control section 192A shown in FIG. 12 indicates start of processing of a predetermined item to the data distribution plan information generating section 194A (STEP S331). The data distribution plan information generating section 194A receives the indication of the data distribution control section 192A and starts an operation, and reads out a "movement day (date)" of the data distribution plan information storage table stored in the data distribution plan information storage section 116AA (STEP S332).

FIG. 16 represents one example of an arrangement of the data distribution plan information storage table. The data distribution plan information storage table 251A is a table having each column of a movement day (date), a region and a distribution data. Here, processing in which the first item (record) of this data distribution plan information storage table 251A is written will be raised as an example. The data distribution plan information generating section 194A shown in FIG. 12 refers to a data "2000. 04. 07" as a corresponding "movement day (date)" in the mobile plan information table 151 of the mobile plan information storage section 115 (STEP S332). And, by using this, the data distribution plan information generating section writes it in the column of the "movement day (date)" in the data distribution plan information storage table 251A (FIG. 16) (STEP S333). Next, the data distribution plan information generating section 194A refers to a corresponding "distribution data" column in the mobile plan information table 151 of the mobile plan information storage section 115 (STEP S334), and writes "STA_TOYAMA.bmp" thereof in the column of the "distribution data" in the data distribution plan information storage table 251A (FIG. 16) (STEP S335).

Next, the data distribution plan information generating section 194A writes the region E calculated by the error calculating section 193A in the column of the "region" (STEP S336). After the above processing is completed, the completion of the processing is notified to the data distribution control section 192A from the data distribution plan information generating section 194A (STEP S339).

Figure 17:
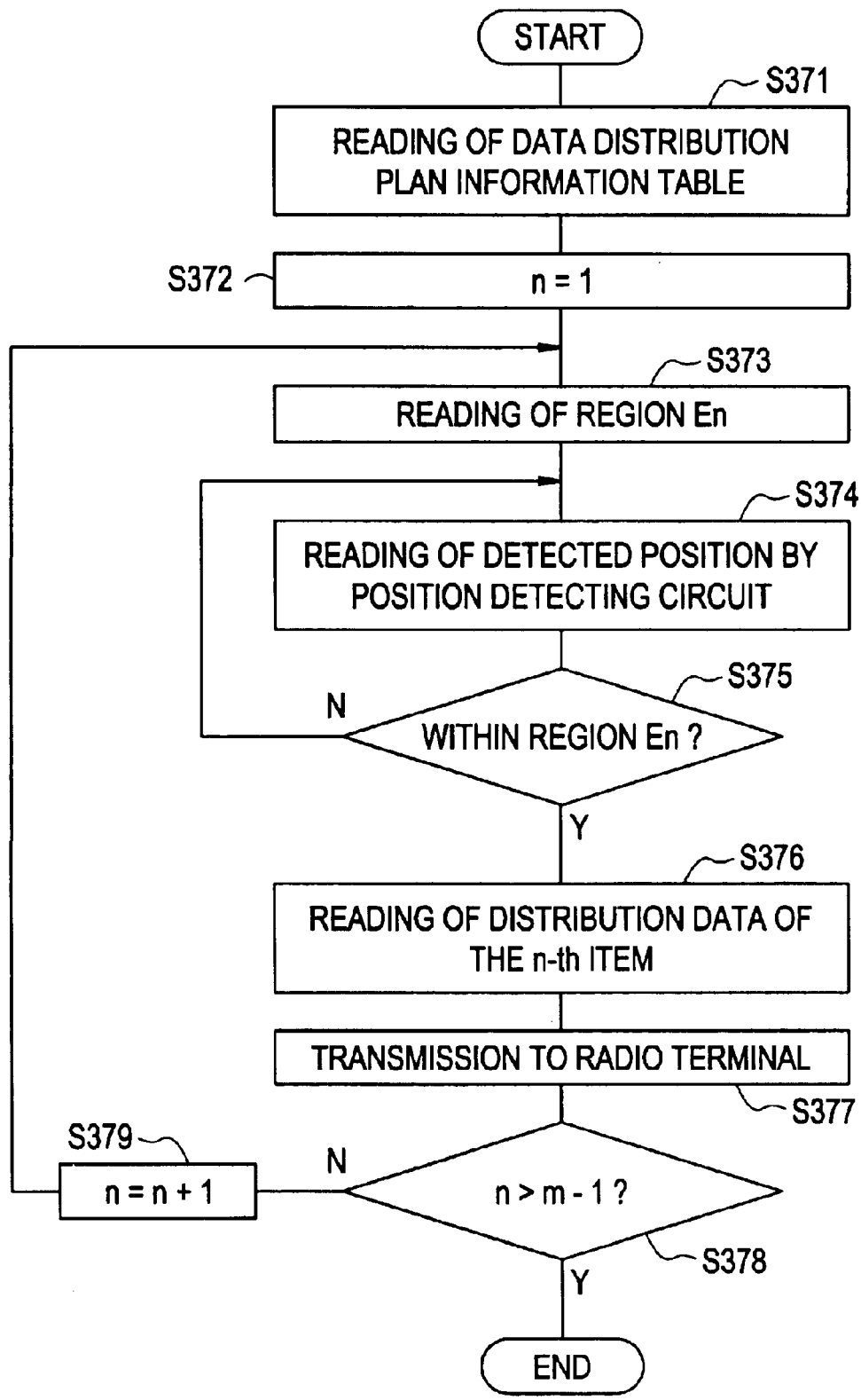

FIG. 17 represents a flow of the distribution processing by means of the data transmitting section shown at STEP S139 in FIG. 3. If receiving the notification (STEP S337 in FIG. 15) of the processing completion from the data distribution plan information generating section 194A, the data distribution control section 192A indicates start of processing to the data transmitting section 113A. Based on this, the data transmitting section 113A conducts reading of the data distribution plan information storage table 251A (FIG. 16) (STEP S371). Next, it initializes a parameter n and sets it to "1" (STEP S372), and conducts reading of a region $E_n$, that is to say, a region $E_1$ (STEP S373). And, the current position of the mobile type telephone set 101 is read out by the position detecting circuit 301 (STEP S374). The data transmitting section 113A checks whether this detected position is within a range of the region $E_n$ (STEP S375). In case that it is outside the range of the region $E_n$ (N), the flow returns to the STEP S374 again, and the similar check is conducted until it becomes to be within the range of the region $E_n$. In addition, an interval of the check can be adjusted by learning by means of a kind of the mobile means and a change of a position of the mobile type telephone set 101, which is detected for every check. Also, in case that the detected position is far from the region $E_n$, it is possible to make a setting of an interval of the check longer. Of course, finally, the check of the position is conducted at a period so that a time point when it is detected that the current position of the mobile type telephone set 101 becomes to be within the range of the region $E_n$ has sufficient accuracy in relation to an error of the position.

In case that the current position of the mobile type telephone set 101 becomes to be within the range of the region $E_n$ (STEP S375:Y). The "distribution data" shown in the first item of the data distribution plan information storage table 251A is read from the distribution data storage section 118 (STEP S376). And, this is transmitted to the mobile type telephone set 101 that is a radio terminal of the user 102 shown in FIG. 2 (STEP S377). In this manner, the error of the position of the destination is taken into account, and the reading of the "distribution data" and the transmission thereof to the mobile type telephone set 101 are conducted, and thereby, a data to be utilized at "Toyama station" is received before the user 102 arrives at "Toyama station".

The data transmitting section 113A successively conducts the distribution to each user time-sequentially, and however, if only a series of distribution work to the user 102 in the modified example is focused, thereafter, whether a value n is larger than "m−1" is checked (STEP S378). In case that it is not larger (N), there are still remains in the distribution work for the mobile type telephone set 101 of this user 102. Accordingly, the value n is counted up by "1"(STEP S379), and the flow returns to the processing at the STEP S373 again and preparation for the next distribution is conducted. And, reading of the "region" column in the n-th, that is to say, second item in the data distribution plan information storage table 251A is conducted (STEP S373). In this manner, the distribution of the distribution data is conducted before each destination. The distribution work for the user 102 goes forward in the same manner, and if the value n becomes larger than "m−1" at STEP S378 (Y), the distribution work for the user 102 ends (END).

In the above-explained embodiment and modified example, an error for time information or place information is obtained, and at a closer time point when the mobile type telephone set 101 or the radio terminal the user 102 carries can start to utilize a distribution data at a destination, distribution is conducted so that the utilization can be started. Similarly, the present invention can realize the distribution so that the user can utilize the distribution data before arriving at the destination by using not only the error based on the concept explained above, but also a variously modified error.

For example, in the calculation by the error calculating section 193, instead of the direct calculation of the error based on the mobile means, mobile velocity of the mobile means is taken into account, and an error of arrival time at an destination can be calculated. In this case, by using the position detecting circuit 301, for example, which is used in the modified example, mobile velocity of the radio terminal is obtained, and distribution timing of a data can be determined by subtracting an error from the time column in the mobile plan information table 151.

Further, although in the embodiment a statistical value in the past is used, and arrival time at a destination is calculated, the distribution center 105 obtains various kinds of traffic information, and an error for arrival at a destination can be corrected.

Also, although in the embodiment and the modified example deletion of the distribution data stored in the radio terminal or the mobile type telephone set 101 is not explained, in case that a memory in these equipments is comparatively smaller, a previous data can be superscribed if necessary at a departure time point to the next destination or a time point after arrival at the next destination and when a new distribution data is received. Thereby, especially like the mobile type telephone set 101, even in a device in which mounting of memories is restricted, efficient utilization of the memories, together with timely reception, can be realized, and reception of comparatively extensive distribution data can be conducted.

As explained above, according to the invention, since a table of the mobile information table is prepared, and in this table, the reference required time periods required when the radio terminal moves to the destination from the departure places are stored in accordance with the mobile means which is used for movement, it is easy to make a mobile plan using standard arrival time to the destination.

Also, according to the invention, by correcting standard day and hour or timing when the radio terminal arrives at the destination by means of an error calculated by the error calculating means, arrival timing can be determined with accuracy, and it is possible to surely distribute a distribution data before arrival at the destination.

Furthermore, compared with the conventional data distribution system wherein distribution is conducted especially without taking time into account if the time is before arrival at a destination, efficient utilization of the memory in the radio terminal can be realized. Also, since the distribution data which is received when the destination is close is always used at the destination in future, there is no fear that a distribution data for the next destination is distributed at about the same time. Accordingly, it is possible to efficiently prevent situation from occurring, in which it takes much time to change electric trains due to a mistake of the received distribution data, and for example, by using a map of a wrong station.

Further, according to the invention, since the approach of the radio terminal to the destination is determined by the longitude and latitude measuring means, even in case that the movement of the mobile means such as an electric train and so forth is delayed so much for some reason and is too early to the contrary, it is possible to exactly distribute a distribution data. Also, since an error in accordance with a destination is corrected, even in case of the first arrival to any place in the destination, it is possible to certainly utilize the distribution data to be utilized at the destination from a time point of the arrival. Also, since the distribution data which is received when the destination is close is always used at the destination in future, there is no fear that a distribution data for the next destination is distributed at about the same time. Accordingly, it is possible to efficiently prevent situation from occurring, in which it takes much time to change electric trains due to a mistake of the received distribution data, and for example, by using a map of a wrong station.

Also, according to the invention, since the arrival scheduled time at the destination is corrected based on actual mobile condition of the radio terminal, even in case that some obstacle to the movement occurs like a case where an accident occurs on the way of the movement to a destination, and even in case that situation that the arrival is significantly too early occurs to the contrary, it is possible to distribute a distribution data with fairly high accuracy. Also, since the distribution data which is received when the destination is close is always used at the destination in future, there is no fear that a distribution data for the next destination is distributed at about the same time. Accordingly, it is possible to efficiently prevent situation from occurring, in which it takes much time to change electric trains due to a mistake of the received distribution data, and for example, by using a map of a wrong station.

Moreover, according to the invention, the error table and the coefficient table are prepared, and since an error is calculated by selecting the coefficients and multiplying the error shown in the error table by the selected coefficients, accuracy of a value of the error is improved, and in addition, even for a new kind of error and a kind of error to be corrected, a double feature of a value and a coefficient of the error, which are basis, can be considered, and thereby, it becomes easy to take measures.

Also, according to the invention, since the variation coefficients of an error in the date and hour are different from each other dependent upon a day, it is possible to calculate arrival time with higher accuracy, and it becomes possible to distribute a distribution data at appropriate timing.

Furthermore, according to the invention, since a distribution data distributed at a time point when the radio terminal arrives at a previous destination is overwritten by a distribution data to be distributed at a time point when the radio terminal arrives at a new destination, the distribution data can be stored at maximum even in a comparatively less memory region, and efficient utilization of the memory region can be realized.

Also, according to the invention, since the mobile information table is suitably updated by means of the newest information, rather than a case in which arrival time at the destination of the radio terminal is estimated using a statistical data, it becomes possible to distribute a distribution data at more correct timing based on the new information.

What is claimed is:

1. A data distribution system comprising:
   a mobile information table for storing reference required time periods which are references of required time periods required when a radio terminal moves to a destination that is a place of a destination of movement from departure places which are origins of the movement, respectively, and that is a place where utilization of information distributed in advance is conducted by means of the radio terminal, in accordance with mobile means which is used for movement;

movement specifying means for specifying departure places and destinations stored in the mobile information table in accordance with a movement schedule together with starting date and hour of the movement and the mobile means;

error calculating means for calculating an error in time for date and hour which is a reference when the radio terminal arrives at the respective destinations, based on information specified by the movement specifying means;

data distribution plan information generating means for obtaining date and hour when the radio terminal arrives at a destination from the respective departure places using the mobile means specified by said movement specifying means by correcting an error calculated by the error calculating means from the date and hour in case of using the reference required time periods, as date and hour when it arrives at the destination most quickly within a range of the error;

arrival time point detecting means for comparing arrival date and hour corrected for each destination, which is generated by the data distribution plan information generating means, with current date and hour, and detecting a time point when said radio terminal arrives at the respective destinations;

distribution data storing means for storing a data to be distributed to said radio terminal for every destination;

distribution data distributing means for distributing distribution data corresponding to a destination from the distribution data storing means every time said arrival time point detecting means detects arrival of said radio terminal at the respective destinations; and an overwrite means for overwriting the distribution data distributed when the radio terminal arrived at a previous destination by the distribution data distributed when the radio terminal arrived at the new destination.

2. A data distribution system recited in claim 1, the data distribution system further comprises:

an error table for representing a standard error of dispersion in time of arrival from a departure place to a destination in accordance with the mobile means, and a coefficient table for storing variation coefficients of an error in date and hour at departure; and wherein said error calculating means calculates an error by multiplying a corresponding error described in the error table by the variation coefficients of an error in date and hour at departure.

3. A data distribution system recited in claim 2, wherein said variation coefficients of an error in said date and hour are different from each other dependent upon a day of week.

4. A data distribution system recited in claim 1, wherein said mobile information table is updated by means of the newest information.

5. A data distribution system comprising:

based on longitude and latitude representing a typical position in destinations that are places where utilization of information distributed in advance is conducted by means of a radio terminal, and areas of the destinations, a longitude and latitude table for contrasting errors between said typical position and other positions in the destinations and storing the errors;

destination specifying means for specifying destinations stored in this longitude and latitude table;

longitude and latitude measuring means for measuring longitude and latitude at respective time points during movement of said radio terminal;

arrival time point detecting means for detecting a time point when a position measured by the longitude and latitude measuring means arrives within a range of said errors centering around said typical position of a corresponding destination stored in said longitude and latitude table, when said radio terminal moves to a destination specified by said destination specifying means;

distribution data storing means for storing a data to be distributed to said radio terminal for every destination;

distribution data distributing means for distributing distribution data corresponding to a destination from the distribution data storing means every time said arrival time point detecting means detects arrival of said radio terminal at the respective destinations; and an overwrite means for overwriting the distribution data distributed when the radio terminal arrived at a previous destination by the distribution data distributed when the radio terminal arrived at the new destination.

6. A data distribution system comprising:

a mobile information table for storing reference required time periods which are references of required time periods required when a radio terminal moves to a destination that is a place of a destination of movement from departure places which are origins of the movement, respectively, and that is a place where utilization of information distributed in advance is conducted by means of the radio terminal, in accordance with mobile means which is used for movement;

movement specifying means for specifying departure places and destinations stored in the mobile information table in accordance with a movement schedule together with starting date and hour of the movement and the mobile means;

longitude and latitude measuring means for measuring longitude and latitude at respective time points during movement of said radio terminal;

error calculating means for successively calculating an error in time for date and hour which is a reference when the radio terminal arrives at a destination by comparing measurement values of the longitude and latitude measuring means with each other;

data distribution plan information generating means for obtaining date and hour when the radio terminal arrives at a destination from the respective departure places using the mobile means specified by said movement specifying means by correcting an error calculated by the error calculating means from the date and hour in case of using the reference required time periods, as date and hour when the radio terminal arrives at the destination most quickly within a range of the error;

arrival time point detecting means for comparing arrival date and hour corrected for each destination, which is generated by the data distribution plan information generating means, with current date and hour, and detecting a time point when said radio terminal arrives at the respective destinations;

distribution data storing means for storing a data to be distributed to said radio terminal for every destination; and distribution data distributing means for distributing distribution data corresponding to a destination from the distribution data storing means every time said arrival time point detecting means detects arrival of said radio terminal at the respective destinations; and an overwrite means for overwriting the distribution data distributed when the radio terminal arrived at a previous destination by the distribution data distributed when the radio terminal arrived at the new destination.

7. A data distribution system recited in claim 6, wherein said mobile information table is updated by means of the newest information.

8. A data distribution system recited in claim 1, further comprising:

means for requesting location information from said radio terminal to be sent at a first periodic time interval by way of a first radio signal sent from said data distribution system to said radio terminal, wherein said means for requesting determines the first period time interval based on a current distance that said radio terminal is away from a next destination of said radio terminal.

9. A data distribution system recited in claim 8, wherein the first periodic time interval is changed to a second periodic time interval that is shorter than the first periodic time interval, by way of a second radio signal sent from said data distribution system to said radio terminal, when said radio terminal is determined to be within a predetermined distance of the next destination of said radio terminal.

10. A data distribution system according to claim 1, wherein the error calculation means comprises:

velocity computing means for computing a velocity of the radio terminal, wherein the error calculation means calculates the error in time for date and hour based on the velocity of the radio terminal.

11. A data distribution system according to claim 2, wherein the mobile means comprises at least one of:

a first mode of travel; and a second mode of travel, wherein the standard error of dispersion stored in the error table is different for the first and second modes of travel with respect to a same departure place and a same destination.

* * * * *